(12) United States Patent
Kobayashi

(10) Patent No.: US 11,942,267 B2
(45) Date of Patent: Mar. 26, 2024

(54) SINTERED BODY AND METHOD FOR PRODUCING SAME

(71) Applicant: Murata Manufacturing Co., Ltd., Nagaokakyo (JP)

(72) Inventor: Eigo Kobayashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 533 days.

(21) Appl. No.: 17/352,990

(22) Filed: Jun. 21, 2021

(65) Prior Publication Data

US 2021/0313102 A1 Oct. 7, 2021

Related U.S. Application Data

(63) Continuation of application No. PCT/JP2019/048434, filed on Dec. 11, 2019.

(30) Foreign Application Priority Data

Dec. 28, 2018 (JP) ................................ 2018-248099

(51) Int. Cl.
*H01F 41/02* (2006.01)
*B22F 1/10* (2022.01)
(Continued)

(52) U.S. Cl.
CPC ............ *H01F 41/0246* (2013.01); *B22F 1/10* (2022.01); *B22F 1/102* (2022.01); *B22F 1/12* (2022.01);
(Continued)

(58) Field of Classification Search
CPC .......... H01F 1/33; H01F 1/37; H01F 41/0246; H01F 41/0206; B22F 1/12; B22F 1/10;
(Continued)

(56) References Cited

U.S. PATENT DOCUMENTS

| 4,808,326 A * | 2/1989 | Tanino ..................... H01F 1/37 428/407 |
| 2011/0097584 A1* | 4/2011 | Takahashi ................ H01F 3/08 419/29 |

(Continued)

FOREIGN PATENT DOCUMENTS

| JP | S63220504 A | 9/1988 |
| JP | 2005243794 A | 9/2005 |

(Continued)

OTHER PUBLICATIONS

Written Opinion of the International Search Authority issued for PCT/JP2019/048434, dated Mar. 10, 2020.

(Continued)

*Primary Examiner* — C Melissa Koslow
(74) *Attorney, Agent, or Firm* — ArentFox Schiff LLP

(57) ABSTRACT

A sintered body containing: a plurality of coated grains each having a metal magnetic body grain coated with a resin layer; a plurality of ferrite grains; and an amorphous phase between the plurality of coated grains and the plurality of ferrite grains. The amorphous phase may contain a metal element that is the same as a metal element contained in the ferrite grains.

20 Claims, 5 Drawing Sheets

(51) Int. Cl.
    *B22F 1/102*     (2022.01)
    *B22F 1/12*     (2022.01)
    *B22F 1/16*     (2022.01)
    *B22F 3/14*     (2006.01)
    *C22C 19/03*     (2006.01)
    *C22C 38/08*     (2006.01)
    *H01F 1/24*     (2006.01)
    *H01F 1/33*     (2006.01)
    *H01F 1/37*     (2006.01)

(52) U.S. Cl.
    CPC ............... *B22F 1/16* (2022.01); *B22F 3/14* (2013.01); *H01F 1/24* (2013.01); *H01F 1/33* (2013.01); *H01F 1/37* (2013.01); *H01F 41/0206* (2013.01); *C22C 19/03* (2013.01); *C22C 38/08* (2013.01); *C22C 2202/02* (2013.01)

(58) Field of Classification Search
    CPC .... B22F 1/16; B22F 1/102; B22F 1/24; B22F 3/14
    See application file for complete search history.

(56) References Cited

U.S. PATENT DOCUMENTS

| | | | |
|---|---|---|---|
| 2020/0139441 A1* | 5/2020 | Funahashi | C04B 35/62222 |
| 2020/0139442 A1* | 5/2020 | Funahashi | C09D 1/00 |

FOREIGN PATENT DOCUMENTS

| | | |
|---|---|---|
| JP | 2007013072 A | 1/2007 |
| JP | 2011089191 A | 6/2011 |
| JP | 2012212853 A | 1/2012 |
| JP | 2016171167 A | 9/2016 |
| JP | 2016219758 A | 12/2016 |
| JP | 2018206834 A | 12/2018 |
| WO | 8607489 A1 | 12/1986 |
| WO | 2019009320 A1 | 1/2019 |

OTHER PUBLICATIONS

International Search Report issued for PCT/JP2019/048434, dated Mar. 10, 2020.

* cited by examiner

FIG. 7(a) – PRIOR ART
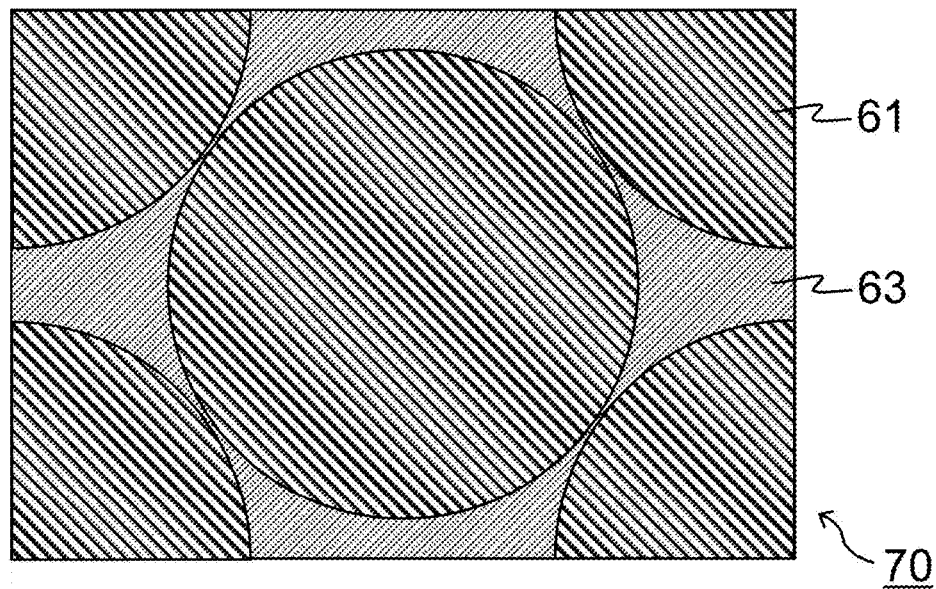
FIG. 7(b) – PRIOR ART
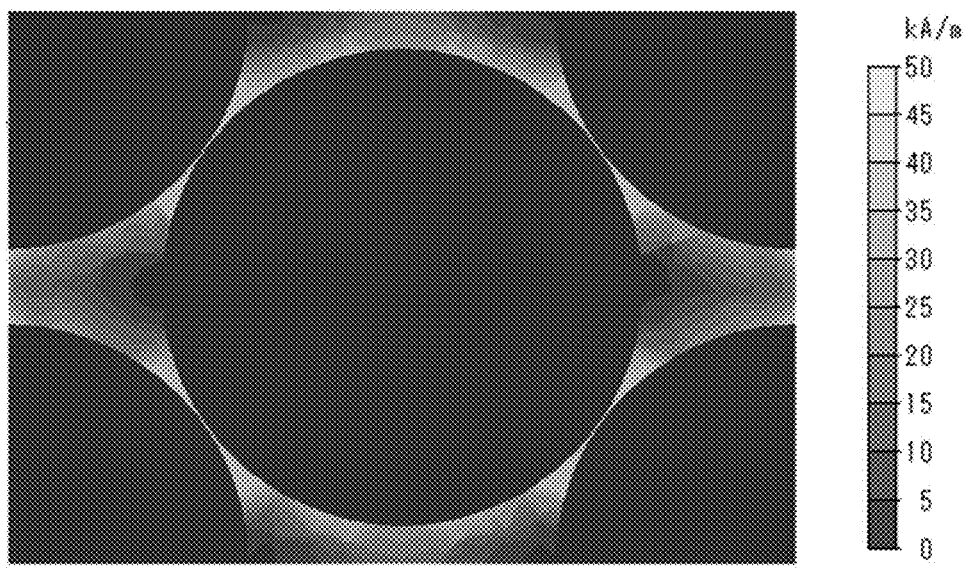

SINTERED BODY AND METHOD FOR PRODUCING SAME

CROSS REFERENCE TO RELATED APPLICATIONS

The present application is a continuation of International application No. PCT/JP2019/048434, filed Dec. 11, 2019, which claims priority to Japanese Patent Application No. 2018-248099, filed Dec. 28, 2018, the entire contents of each of which are incorporated herein by reference.

FIELD OF THE INVENTION

The present invention relates to a sintered body, more specifically a sintered body containing a metal magnetic body; and a method for producing the sintered body.

BACKGROUND OF THE INVENTION

A sintered body containing a metal magnetic body has been used as a sintered magnetic component that is molded in a given shape in various electromagnetic apparatuses/devices. Heretofore, a soft magnetic powder core has been used in, for example, a power inductor that is used around an electric power circuit. A soft magnetic powder core can be produced by molding grains which are produced by coating metal magnetic body grains with an insulating material such as a resin. In general, a metal magnetic body has a higher saturation magnetic flux density compared with an oxide magnetic body such as a ferrite, and therefore has excellent direct-current bias characteristics. However, a metal magnetic body has such characteristic properties that the specific resistance is low and the eddy current loss becomes large particularly in a high-frequency region. In the soft magnetic powder core, therefore, the increase in eddy current loss has been inhibited by coating the surfaces of the metal magnetic body grain with an insulating material such as a resin.

The insulating material to be used in the conventional soft magnetic powder core is a non-magnetic body such as a resin, and has a drawback that the overall magnetic permeability of the soft magnetic powder core is decreased because the insulating material acts as a non-magnetic gap. In order to overcome this drawback, it has been attempted to improve the magnetic permeability by introducing a ferrite that is a ferromagnetic body into gaps between the metal magnetic body grains. However, a ferrite can react with a metal magnetic body and, as a result, a new problem that the metal magnetic body is oxidized into a non-magnetic oxide layer while the ferrite is reduced and is decreased in specific resistance may occur.

In these situations, in order to address these problems, Patent Document 1 has proposed a method for producing a sintered body containing a metal magnetic body, the method including: forming a coating layer composed of an oxide or oxycarbide of an element such as Li, Ca and Al on the surface of the metal magnetic powder to form a composite powder; arranging a ferrite material around the composite powder; subjecting the resultant product to pressure molding to form a molded article having a given shape; and subjecting the molded article to a heat treatment to obtain the sintered body. The coating layer is made from a substance that is poorly reactive with the metal magnetic body but is highly reactive with the ferrite. According to this sintered body production method, the coating layer reacts with the ferrite while inhibiting the reaction between the metal magnetic powder and the ferrite with the coating layer during the heat treatment (firing) to form a ferrite layer having a different composition from that of the original ferrite material, thereby producing a sintered body in which grains of the metal magnetic powder are present independently to each other in the continuous ferrite layer.

Patent Document 1: Japanese Patent Application Laid-Open No. 2005-243794

SUMMARY OF THE INVENTION

In the sintered body production method disclosed in Patent Document 1, however, because the coating layer that serves as a material for insulating the grains of the metal magnetic powder from each other and the ferrite material (or the ferrite layer formed from the ferrite material) are ferrite materials that are brittle materials, it is impossible to follow the movement (or plastic deformation) of the metal magnetic powder which may be caused upon the application of an external force (which is applied, for example, during molding). As a result, when the grains of the metal magnetic powder come close to each other or come in contact with each other, the decrease in specific resistance and the increase in eddy current loss may be caused, leading to the deterioration in electrical properties.

Furthermore, the sintered body produced by the production method disclosed in Patent Document 1 has a drawback that direct-current bias characteristics are poor. This reason is because the sintered body is composed of only the metal magnetic powder and the ferrite layer and does not contain any non-magnetic body. In more detail, the reason is as follows.

As shown in FIG. 7($a$), the sintered body 70 produced by the production method disclosed in Patent Document 1 has such a configuration that the metal magnetic powder (i.e., metal magnetic body grains) 61 is located in the continuous ferrite layer (i.e., the ferrite phase) 63. When a direct-current magnetic field is applied to the sintered body 70 having this configuration, a magnetic field that is larger than an external magnetic field is generated in the ferrite layer 63 as shown in FIG. 7($b$). (FIG. 7($b$) shows a magnetic field distribution when an external magnetic field of 4 kA/m is applied to the sintered body 70. As is understood from this diagram, although the magnetic field generated in the metal magnetic powder 61 is equal to or smaller than the external magnetic field, the magnetic field generated in the ferrite layer 63 is larger than the external magnetic field and, particularly in a region where the grains of the metal magnetic powder 61 come close to each other, a magnetic field of about 50 kA/m is generated in the ferrite layer 63.) This is because the magnetic susceptibility of the metal magnetic powder is large and, therefore, a magnetic field having the same direction as that of the external magnetic field is generated in the ferrite layer as the result of the magnetization of the metal magnetic powder. As mentioned above, because the ferrite layer is exposed to a larger magnetic field than the external magnetic field and is a material having a low saturation magnetic flux density by its nature, the ferrite layer is magnetically saturated with a lower magnetic field compared with the metal magnetic powder. Based on the above-mentioned principle, the ferrite layer is magnetically saturated with a lower magnetic field to decrease the magnetic permeability. Consequently, the sintered body is decreased in magnetic permeability as a whole in a lower magnetic field. As a result, the direct-current bias characteristics of the sintered body are deteriorated.

One object of the present invention is to provide a sintered body containing a metal magnetic body, which can be reduced in the deterioration in electrical properties upon the application of an external force and can have excellent direct-current bias characteristics. Another object of the present invention is to provide a method for producing the sintered body.

According to one aspect of the present invention, a sintered body containing a metal magnetic body is provided, wherein the sintered body includes: a plurality of coated grains each including a metal magnetic body grain coated with a resin layer; a plurality of ferrite grains; and an amorphous phase between the plurality of coated grains and the plurality of ferrite grains.

In one embodiment of the present invention, the amorphous phase may contain a metal element that is the same as a metal element contained in the ferrite grains.

In one embodiment of the present invention, the average grain diameter of the ferrite grains may be smaller than the average grain diameter of the metal magnetic body grains.

In one embodiment of the present invention, the resin layer may include at least one component selected from the group consisting of polyimide, polyamide, polyamide-imide, polyethylene terephthalate, polyetherimide, polytetrafluoroethylene, an epoxy resin and a silicone-based resin.

In one embodiment of the present invention, each of the metal magnetic body grains may include at least one metal magnetic body selected from the group consisting of Fe, a Fe—Si-based metal magnetic body, a Fe—Ni-based metal magnetic body, a Fe—Ni—Mo-based metal magnetic body, a Fe—Si—Al-based metal magnetic body, a Fe—Si—Cr-based metal magnetic body, a Fe-based amorphous metal and a Fe nanocrystal.

In one embodiment of the present invention, each of the ferrite grains may include at least one component selected from the group consisting of Ni—Zn-based ferrite, Ni—Zn—Cu-based ferrite, Ni-based ferrite, Co-based ferrite, Co—Zn-based ferrite, Mn—Zn-based ferrite, Mg—Zn-based and Mg—Zn—Cu-based spinel-type ferrites and magnetopulmbite-type hexagonal Ba ferrites.

In one embodiment of the present invention, the resin layer may have an average thickness of 100 nm or less.

According to another aspect of the present invention, a method for producing a sintered body includes heating a mixture of a plurality of coated grains each including (1) a metal magnetic body grain coated with a resin layer, (2) a plurality of ferrite grains and (3) a metal acetylacetonate at a temperature of the melting point of the metal acetylacetonate or higher and 350° C. or lower under pressure.

In one embodiment of the present invention, the mixture may be heated in the presence of a fluid.

In one embodiment of the present invention, the fluid may be mixed with the mixture.

In one embodiment of the present invention, the metal acetylacetonate may contain a metal element that is the same as a metal element contained in the ferrite grains.

In one embodiment of the present invention, the average grain diameter of the ferrite grains may be smaller than the average grain diameter of the metal magnetic body grains.

In one embodiment of the present invention, the resin layer may include at least one component selected from the group consisting of polyimide, polyamide, polyamide-imide, polyethylene terephthalate, polyetherimide, polytetrafluoroethylene, an epoxy resin and a silicone-based resin.

In one embodiment of the present invention, each of the metal magnetic body grains may include at least one metal magnetic body selected from the group consisting of Fe, a Fe—Si-based metal magnetic body, a Fe—Ni-based metal magnetic body, a Fe—Ni—Mo-based metal magnetic body, a Fe—Si—Al-based metal magnetic body, a Fe—Si—Cr-based metal magnetic body, a Fe-based amorphous metal and a Fe nanocrystal.

In one embodiment of the present invention, each of the ferrite grains may include at least one component selected from the group consisting of Ni—Zn-based ferrite, Ni—Zn—Cu-based ferrite, Ni-based ferrite, Co-based ferrite, Co—Zn-based ferrite, Mn—Zn-based ferrite, Mg—Zn-based and Mg—Zn—Cu-based spinel-type ferrites and magnetopulmbite-type hexagonal Ba ferrites.

In one embodiment of the present invention, the resin layer may have an average thickness of 100 nm or less.

According to the present invention, a sintered body containing a metal magnetic body is provided, which can be reduced in the deterioration in electrical properties upon the application of an external force and can achieve excellent direct-current bias characteristics. Furthermore, according to the present invention, a method for producing the sintered body is also provided.

BRIEF EXPLANATION OF THE DRAWINGS

FIG. 7(a) is a partial schematic diagram showing the structure of a sintered body produced by the producing method disclosed in Patent Document 1.

FIG. 7(b) is a diagram corresponding to the diagram shown in FIG. 7(a), which shows the magnetic field distribution obtained by simulation when an external magnetic field of 4 kA/m is applied.

DETAILED DESCRIPTION OF THE INVENTION

Figure 1:
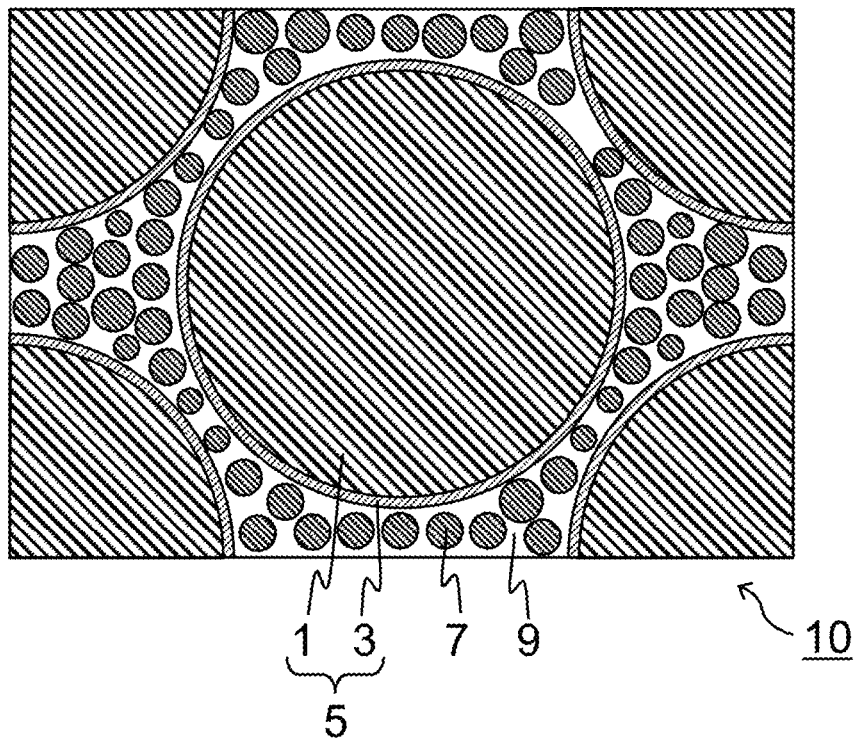
FIG. 1 is a partial schematic diagram showing the structure of each of a sintered body in one embodiment of the present invention and sintered bodies in Examples 1 to 3.

Hereinbelow, a sintered body in one embodiment of the present invention and a method for producing the sintered body will be described with reference to drawings. In the drawings, the same number is assigned to the same members, and is accompanied by the same explanation unless otherwise stated.

As shown in FIG. 1, a sintered body 10 containing a metal magnetic body in this embodiment includes: a plurality of coated grains (or resin-coated metal magnetic body grains) 5 in which each of metal magnetic body grains 1 is coated with a resin layer 3; a plurality of ferrite grains 7; and an amorphous phase 9 which is located between the plurality of coated grains 5 and the plurality of ferrite grains 7.

Each of the metal magnetic body grains 1 may be composed of a metal magnetic body. The metal magnetic body is a magnetic body composed of one type or two or more types of metal or alloy. The metal magnetic body which can be used in this embodiment is not particularly limited, and may contain, for example, at least one metal magnetic body selected from the group consisting of Fe, a Fe—Si-based metal magnetic body, a Fe—Ni-based metal magnetic body, a Fe—Ni—Mo-based metal magnetic body, a Fe—Si—Al-based metal magnetic body, a Fe—Si—Cr-based metal magnetic body, a Fe-based amorphous metal and a Fe nanocrystal. Among these components, a Fe—Si-based metal magnetic body is preferred, because this metal magnetic body has a high saturation magnetic flux density and can improve the direct-current bias characteristics of the sintered body 10. When the metal magnetic body is an alloy, the content ratios of metal elements may be selected appropriately depending on the desired electrical properties. Without limiting this embodiment, the Fe—Si-based metal magnetic body may contain 0.1 to 8.0% by mass of Si, with the remainder being Fe. The Fe—Ni-based metal magnetic body may contain 36 to 90% by mass of Ni, with the remainder being Fe. The Fe—Ni—Mo-based metal magnetic body may contain 36 to 90% by mass of Ni and 0.1 to 10% by mass of Mo, with the remainder being Fe. The Fe—Si—Al-based metal magnetic body may contain 0.1 to 10% by mass of Si and 0.1 to 12% by mass of Al, with the remainder being Fe. The Fe—Si—Cr-based metal magnetic body may contain 0.1 to 8.0% by mass of Si and 0.1 to 20% by mass of Cr, with the remainder being Fe. The Fe-based amorphous metal is composed of Fe or a Fe-based metal (e.g., Fe—Si—B), and is an amorphous metal. The Fe nanocrystal is composed of Fe and is a metal in which an amorphous is the main phase and nanocrystals having an average grain diameter of 5 or more and 25 nm or less are mixed therein.

The average grain diameter of the metal magnetic body grains 1 may be, for example, 0.01 to 1000 μm, preferably 0.02 to 100 μm. When the average grain diameter of the metal magnetic body grains 1 falls within the range of 0.01 to 1000 μm, in the producing method mentioned below in this embodiment, the metal magnetic body grains are more likely to be delivered to gaps formed between the other metal magnetic body grains by means of a liquid medium and/or a fluid (preferably solvent) derived from the metal acetylacetonate, resulting in the effective achievement of the increase in density of the sintered body obtained the producing method. The term "average grain diameter" as used herein refers to a grain diameter (D50) at a point at which an accumulated value becomes 50% in a cumulative curve which is obtained by determining a volume-based grain size distribution and in which the total volume is 100%. The average grain diameter can be measured using a laser diffraction/scattering grain diameter/grain size distribution measurement device or a scanning electron microscope.

The metal magnetic body grains 1 may be a mixture of two or more types of metal magnetic body grains having different metal magnetic body compositions and/or different average grain diameters from each other.

The resin layer 3 may be composed of a resin material. The resin material which can be used in this embodiment is not particularly limited, as long as the resin material does not have electrical conductivity. For example, the resin material may contain at least one component selected from the group consisting of polyimide, polyamide, polyamide-imide, polyethylene terephthalate, polyetherimide, polytetrafluoroethylene, an epoxy resin and a silicone-based resin. Among these components, polyimide is preferred, because polyimide has high insulation properties and also has excellent heat resistance and strength and can improve the specific resistance, heat resistance and strength of the sintered body 10.

The resin layer 3 may have a single-layer structure, or may have a multi-layer structure composed of two or more layers respectively made from resin material having different compositions.

The thickness of the resin layer 3 is not particularly limited, as long as the electrical conduction can be prevented, preferably insulation can be achieved, between the metal magnetic body grains 1. For example, the average thickness of the resin layer 3 may be, for example, 200 nm or less, preferably 100 nm or less. The lower limit of the average thickness is not particularly limited, and may be, for example, 10 nm or more. When the average thickness of the resin layer 3 is 200 nm or less, the eddy current loss can be reduced and excellent direct-current bias characteristics can be achieved without substantially decreasing the total magnetic permeability of the sintered body 10. Furthermore, when the average thickness of the resin layer 3 is 100 nm or less, the magnetic permeability can also be improved significantly compared with the case of conventional sintered bodies each composed of metal magnetic body grains and a resin layer (e.g., Comparative Example 2) when the filling rate of the metal magnetic body grains 1 is higher.

The resin layer 3 preferably coats the entire surface of the metal magnetic body grains 1. However, it is not necessarily required for the resin layer 3 to coat the whole surface areas of the metal magnetic body grains 1. The metal magnetic body grains 1 may be exposed partly, for example by less than 50%, more specifically by less than 10%, of the total surface area of the metal magnetic body grains 1, may be exposed on the resin layer 3.

The average thickness of the resin layer can be determined in the following manner. With respect to a single metal magnetic body grain, in a scanning electron microscope (SEM) observation image of a sectional surface of the sintered body, the thickness of the resin layer is measured at 10 points or more located on the surface of the metal magnetic body grain which are apart from each other at approximately equal intervals, and then the average value of the measurement values is calculated. This procedure is carried out with respect to 5 metal magnetic body grains 1 in total, and the calculated average values are averaged.

The average grain diameter of the coated grains 5 can be understood as the sum total of the average grain diameter of the metal magnetic body grains 1 and the average thickness of the resin layer 3. However, the average grain diameter may also be measured from the coated grains that are used as a raw material. The average grain diameter of the coated grains 5 may be, for example, 0.02 to 1000 μm, preferably 0.11 to 100 μm.

Each of the ferrite grains 7 may be composed of a ferrite. The ferrite is a magnetic body, preferably a ferromagnetic body, containing iron oxide. The ferrite which can be used in this embodiment is not particularly limited, and may include, for example, at least one component selected from the group consisting of Ni—Zn-based ferrite, Ni—Zn—Cu-based ferrite, Ni-based ferrite, Co-based ferrite, Co—Zn-based ferrite, Mn—Zn-based ferrite, Mg—Zn-based ferrite, and Mg—Zn—Cu-based spinel-type ferrites and magnetopulmbite-type hexagonal Ba ferrites. Among these ferrites, a ferrite containing Ni and Zn (e.g., a N—Zn-based ferrite, a Ni—Zn—Cu-based ferrite), a Ni-based ferrite, a Co-based ferrite, a Co—Zn-based ferrite, a Mg—Zn-based ferrite, and a Mg—Zn—Cu-based ferrite are preferred, because these ferrites have high specific resistance and can reduce the eddy current loss of the sintered body 10.

The spinel-type ferrite is a magnetic material containing iron oxide and having a spinel-type structure, and examples of the spinel-type ferrite include a ferrite represented by the compositional formula: $AFe_2O_4$, a ferrite represented by the compositional formula: $A^1_xA^2_{1-x}Fe_aO_{4\pm\delta}$, and a ferrite represented by the compositional formula: $A^3_xA^4_yA^5_zFe_aO_{4\pm\delta}$ (wherein x+y+z=1, 1.5≤a≤2.55, 0≤δ<1). Each of A and $A^1$ to $A^5$ may represent an arbitrary metal such as Mn, Co, Ni, Cu, Zn, Li, Fe and Mg, preferably Ni, Zn, Fe, Mn, Co or Li.

The average grain diameter of the ferrite grains 7 is preferably smaller than the average grain diameter of the metal magnetic body grains 1 (therefore is inevitably smaller than the average grain diameter of the coated resin 5). The average grain diameter of the ferrite grains 7 may be 50% or less, more specifically 0.1 to 30%, of the average grain diameter of the metal magnetic body grains 1. More specifically, the average grain diameter of the ferrite grains 7 may be, for example, 0.01 to 100 μm, preferably 0.02 to 1 μm. When the average grain diameter of the ferrite grains 7 is smaller than the average grain diameter of the metal magnetic body grains 1, in the producing method mentioned below in this embodiment, the ferrite grains can be delivered more easily to gaps between the metal magnetic body grains by means of a liquid medium and/or a fluid (preferably solvent) derived from the metal acetylacetonate, resulting in the increase in magnetic permeability of the sintered body obtained the producing method.

The ferrite grains 7 may be a mixture of two or more types of ferrite grains respectively having different ferrite compositions and/or different average grain diameters from each other.

The amorphous phase 9 is located between the coated grains 5 and the ferrite grains 7 and can adhere these grains to each other strongly. Without limiting this embodiment, it is possible to form such a structure that a plurality of the coated grains 5 and a plurality of the ferrite grains 7 are dispersed in a continuous phase formed by the amorphous phase 9. Furthermore, the sintered body 10 according to this embodiment can contain these grains at a high density due to the presence of the amorphous phase 9, and particularly can contain the metal magnetic body grains 1 at a high filling rate. The filling rate of the metal magnetic body grains can be determined by performing image analysis in a scanning electron microscope (SEM) observation image of a sectional surface of the sintered body.

Therefore, in the sintered body 10 according to this embodiment, it becomes possible to follow the movement of the coated grains 5 (e.g., the plastic deformation of the metal magnetic body) due to the presence of the relatively flexible and plastically deformable amorphous phase 9 when an external force is applied (e.g., during molding) while keeping the high strength and a high density of the sintered body 10. As a result, the approximation or close contact of the metal magnetic body grains 1 to each other in association with the destruction of the resin layer 3 can be prevented, the specific resistance can be increased, and the eddy current loss can be reduced, resulting in the prevention of the deterioration in electrical properties. Without limiting this embodiment, the iron loss in a high-frequency region of 10 MHz or more can be reduced as the result of the reduction in the eddy current loss, and therefore the sintered body 10 according to this embodiment can be used suitably as a core material in a power inductor for high frequency.

Furthermore, in the sintered body 10 according to this embodiment, because each of the metal magnetic body grains 1 is coated with the resin layer 3, the eddy current loss can be reduced and excellent direct-current bias characteristics can be exerted. Moreover, in the sintered body 10 according to this embodiment, because the resin layer 3 is introduced as a non-magnetic gap between the metal magnetic body grains 1 and the ferrite grains 7, a direct-current magnetic field generated in the ferrite grains 7 can be reduced and the direct-current bias characteristics can be improved.

Still further, the sintered body 10 according to this embodiment does not contain any resin other than the resin layer 3, and therefore can have such a structure that spaces other than the coated grains 5 (in which each of the metal magnetic body grains 1 is coated with the resin layer 3) and the amorphous phase 9 are occupied by the ferrite grains 7. Therefore, a higher magnetic permeability can also be achieved compared with the case of a conventional sintered body that is composed of metal magnetic body grains and resin layers (e.g., Comparative Example 2) when the filling rate of the metal magnetic body grains 1 is small. As a result, when it is intended to achieve a given magnetic permeability, the filling rate of the metal magnetic body grains 1 can be reduced, and therefore the distance between the metal magnetic body grains 1 can be kept large, resulting in the increase in specific resistance and the decrease in the eddy current loss.

The amorphous phase 9 may contain a metal element that is the same as a metal element contained in the ferrite grains 7. Therefore, the amorphous phase 9 can exhibit electrical properties similar to those of the ferrite grains 7. Furthermore, when mutual diffusion between the ferrite grains 7 and the amorphous phase 9 occurs, the deterioration in the electrical properties of the sintered body 10 can be prevented effectively.

The term "amorphous phase" as used herein refers to a phase having substantially no crystallinity or having relatively small crystallinity, and the amorphous phase can be distinguished from grains each having a crystal structure on the basis of an electron beam diffraction image that is a technique known to a person skilled in the art. The element (particularly the metal element) contained in the amorphous phase can be confirmed using a scanning transmission electron microscope (STEM).

In the sintered body 10 according to this embodiment, it should be noted that the amorphous phase 9 contains substantially no silicon oxide such as $SiO_2$ glass. The presence of a silicon oxide is not preferred, because significant decrease in electrical properties may be caused. The content of the silicon oxide in the amorphous phase 9 is, for example, 0.1% by mass or less, preferably 0.01% by mass or less, more preferably substantially 0% by mass.

The term "sintered body" as used herein refers to an object produced by heating a raw material mixture containing the metal magnetic body grains at a temperature lower than the melting point of the metal magnetic body constituting the grains. The shape of the sintered body is not particularly limited, and may be a film-like shape, a bulky shape, or a shape of a molded article.

The sintered body 10 according to this embodiment can be produced by any proper method. For example, the sintered body 10 can be produced by the following method.

Firstly, coated grains 5 in which each of metal magnetic body grains 1 is coated with a resin layer 3 are prepared. The method for coating each of the metal magnetic body grains 1 with the resin layer 3 is not particularly limited. For example, it is possible to immerse the metal magnetic body grains 1 in a resin precursor solution, then pulling up the metal magnetic body grains 1 coated with the resin precursor solution or separating the metal magnetic body grains 1 coated with the resin precursor solution with a magnet from the resin precursor solution itself, and then converting the resin precursor into a resin by heating to form a resin layer 3 that coats each of the metal magnetic body grains 1.

Separately, ferrite grains 7 are prepared. The ferrite grains 7 can be produced by any proper method. For example, the ferrite grains 7 can be produced by temporally firing a mixture prepared by mixing raw material oxides in such a manner that a desired ferrite composition can be achieved (to produce a temporally fired powder) and then pulverizing the temporally fired powder to a size close to a desired size.

Subsequently, a mixture containing the coated grains 5, the ferrite grains 7 and a metal acetylacetonate (wherein the mixture is also referred to as a "raw material mixture", hereinafter) is supplied into a mold form for molding use or onto any proper substrate (wherein the substrate may be removed or may not be removed from a sintered body 10 finally) and is then heated at a temperature of the melting point of the metal acetylacetonate or higher and 350° C. or lower under pressure to produce a sintered body 10 containing the metal magnetic body.

The mold form or the substrate in or to which the raw material mixture has been supplied may be subjected to a treatment such as drying or spontaneous air-drying under heating as required, and then can be heated at a temperature of the melting point of the metal acetylacetonate or higher and 350° C. under pressure or lower using a means known to a person skilled in the art, such as a pressing machine.

The term "metal acetylacetonate" as used herein refers to an acetylacetonate salt of a metal, more specifically a chelate complex having an acetylacetonate ion (($CH_3COCHCOCH_3$)$^-$, also abbreviated as "(acac)-", hereinafter) that is a bidentate ligand and a center metal. It is preferred that the metal element contained in the metal acetylacetonate is the same metal element as a metal element contained in the ferrite grains 7.

As the metal acetylacetonate, a single metal acetylacetonate may be used, or two or more metal acetylacetonates may be used in combination. When two or more metal elements are contained in the ferrite grains 7, it is possible to use a combination of two or more metal acetylacetonates corresponding to the abundance ratio of the metal elements. In this manner, the composition of the ferrite grains 7 and the composition of the amorphous phase 9 containing a substance derived from the metal acetylacetonate can contain the same type of metal element. As a result, if the mutual diffusion between the ferrite grains and the amorphous phase occurs, the deterioration in the properties of the sintered body can be prevented.

The raw material mixture can be prepared by mixing the coated grains 5, the ferrite grains 7 and the metal acetylacetonate together. This mixing can be carried out under an atmosphere having an ambient temperature, an ambient humidity and an atmospheric pressure. The metal acetylacetonate may be mixed in an amount of, for example, 0.1% by mass to 50% by mass, preferably 1% by mass to 30% by mass, more preferably 2% by mass to 10% by mass, relative to the total mass of the coated grains 5 and the ferrite grains 7.

The metal acetylacetonate to be mixed may have any form. For example, the raw material mixture may be prepared by mixing the coated grains 5, the ferrite grains 7 and a solid metal acetylacetonate having a dried powdery form together. In this case, the raw material mixture can be prepared by mixing the coated grains 5, the ferrite grains 7 and the metal acetylacetonate having a powdery form together by employing a conventional mixing method which is carried out, for example, under an atmospheric pressure in one or two or more of solvent selected from the group consisting of water, acetylacetone, an alcohol including methanol and/or ethanol and the like or in one or two or more of gas selected from the group consisting of air, nitrogen and the like.

Alternatively, the raw material mixture may be prepared by mixing the coated grains 5, the ferrite grains 7, the metal acetylacetonate and a solvent together. As the solvent, any appropriate solvent may be used, and may be, for example, a solvent selected from the group consisting of water, acetylacetone, an alcohol including methanol and/or ethanol and the like or a mixture of one or two or more of these solvents. The amount of the solvent is not particularly limited, as long as the amount is not too large and is suitable for the heating of the raw material mixture under pressure. The solvent may be mixed in an amount of, for example, 50% by mass or less, preferably 30% by mass or less, relative to the total mass of the coated grains 5 and the ferrite grains 7. In the mixing, the metal acetylacetonate and the solvent may be used separately, or a liquid material prepared by dispersing or dissolving the metal acetylacetonate in the solvent may be used. In the latter case, a liquid material obtained as the result of the synthesis of the metal acetylacetonate may be used without the need to separate the metal acetylacetonate therefrom. More specifically, the metal acetylacetonate can be synthesized by mixing acetylacetone having a liquid form with a metal compound (e.g., a hydroxide or chloride of a metal), and a liquid material resulting from the synthesis can be used without any treatment or, alternatively, a solvent may be further added to the liquid material upon use if necessary.

In addition to the coated grains 5, the ferrite grains 7 and the metal acetylacetonate, the raw material mixture may further contain any appropriate material as long as the desired electrical properties cannot be adversely affected. More specifically, the raw material mixture may further contain an additive such as a pH modifier, a sintering additive and a pressure relaxing agent. The additive may be mixed in an amount of, for example, 0.01% by mass to 10% by mass, preferably 0.01% by mass to 1% by mass, more preferably 0.01% by mass to 0.1% by mass, relative to the total mass of the coated grains 5 and the ferrite grains 7.

The raw material mixture prepared as mentioned above is heated at a temperature of the melting point of the metal acetylacetonate or higher and 350° C. or lower under pressure to form a sintered body having a relatively high density. In the heating step, the metal acetylacetonate is liquidized and can act as a liquid medium. The heating is preferably carried out in the presence of a fluid. The term "fluid" as used herein is a liquid, preferably a liquid that can be used as a solvent, more preferably water. For example, when water is present during the heating and pressurization of the raw material mixture, the water can exist at the interfaces between the coated grains 5 and the ferrite grains 7 contained in the raw material mixture. As a result, the raw material mixture can be sintered at a lower temperature and the strength of the sintered body can be improved effectively.

The wording "the mixture is in a water-containing state" as used herein refers to the state where water may be or may not be added actively to the mixture and it is only required for water to be present in a trace amount at the interfaces between the coated grains 5 and the ferrite grains 7. Alternatively, the degree of the presence of water may be such that the coated grains 5 and the ferrite grains 7 absorb moisture at room temperature. The active addition of water may be performed by impregnating the raw material mixture with water (i.e., mixing) or may be performed by carrying out the heating and the pressurization of the raw material mixture under a water vapor atmosphere. Particularly when water is allowed to exist by mixing the water with the raw material mixture, it becomes possible to spread the water effectively from the interfaces between the grains. When water is mixed with the raw material mixture, the amount of the water is not particularly limited, and may be, for example, 20% by mass or less, preferably 15% by mass or less, typically 10% by mass, relative to the total mass of the coated grains 5 and the ferrite grains 7. When the amount of water to be mixed with the raw material mixture is adjusted to 20% by mass or less, it becomes possible to mix the water with the raw material mixture and to prevent the deterioration in moldability of the raw material mixture more effectively. For achieving the improvement in the strength of the sintered body effectively, it is preferred to use water as much as possible within the above-mentioned range, more specifically in an amount of 10% by mass to 20% by mass. Furthermore, for achieving the molding more easily, it is preferred to use water as small as possible within the above-mentioned range, more specifically in an amount of more than 0% by mass and 10% by mass or less.

The pressure to be applied for the pressurization of the raw material mixture is, for example, 1 MPa to 5000 MPa, preferably 5 MPa to 1000 MPa, more preferably 10 MPa to 500 MPa. The term "pressurization of the raw material mixture" as used herein refers to, for example, the matter that a pressing force (or a physical/mechanical pressure) is applied to the raw material mixture (more specifically a solid component contained in the raw material mixture) by using, for example, a pressure molding machine. Therefore, attention should be paid to the matter that a liquid component contained in the raw material mixture is also exposed to a pressure in the surrounding atmosphere (generally an atmospheric pressure) when the raw material mixture is in a pressurized state.

The temperature to be employed for the heating of the raw material mixture (wherein the temperature is also referred to as a "heating temperature", hereinafter) is a firing temperature, and may be a temperature of the melting point of the metal acetylacetonate contained in the raw material mixture or higher and 350° C. or lower. The term "melting point" as used herein refers to a temperature measured by the method prescribed in the JIS standard at room temperature under an atmospheric pressure. The melting point may vary depending on various conditions including the pressure to be applied for the pressurization. The melting points of various metal acetylacetonates are shown in Table 1. When two or more metal acetylacetonates are used, the "melting point of the metal acetylacetonate" refers to a highest melting point among the melting points of all of the metal acetylacetonates. The heating temperature for the raw material mixture may vary depending on the type of the materials for the metal magnetic body grains 1, the resin layer 3, the ferrite grains 7 and the like to be used, especially the resin to be used in the resin layer 3, and may be higher by 5° C. or more than the melting point of the metal acetylacetonate and 350° C. or lower, preferably 100° C. to 320° C.

TABLE 1

| Metal acetylacetonate | Melting point (□) |
| --- | --- |
| Iron acetylacetonate | 185 |
| Nickel acetylacetonate | 230 |
| Zinc acetylacetonate | 125 |
| Copper acetylacetonate | 284 |

TABLE 1-continued

| Metal acetylacetonate | Melting point (□) |
| --- | --- |
| Cobalt acetylacetonate | 198 |
| Manganese acetylacetonate | 161 |
| Magnesium acetylacetonate | 276 |
| Barium acetylacetonate | 320 |

As mentioned above, the raw material mixture is heated at a temperature of the melting point of the metal acetylacetonate or higher under pressure, and, as a result, a sintered body having a relatively high density can be formed at a lower temperature as mentioned above. According to this embodiment, the resin layer 3 is present between the metal magnetic body grains 1 and the ferrite grains 7, and, as a result, the interaction between the metal magnetic body and the ferrite can be inhibited. The metal magnetic body grains 1 contained in the sintered body can be considered to be substantially the same as the metal magnetic body grains 1 contained in the raw material mixture. The time required for the heating and the pressurization of the raw material mixture may be selected appropriately, and is preferably 10 minutes to 120 minutes.

In this manner, the sintered body 10 according to this embodiment can be produced. The sintered body 10 has such a structure that the amorphous phase 9 derived from the metal acetylacetonate intervenes between the coated grains 5 and the ferrite grains 7. In the amorphous phase 9, a metal element derived from the metal acetylacetonate is contained. In the amorphous phase 9, a metal element contained in the ferrite grains 7 may also be contained.

In the method for producing the sintered body 10 according to this embodiment, the raw material mixture is heated at a temperature of the melting point of the metal acetylacetonate or higher and 350° C. or lower under pressure. Because the heating temperature is not higher than 350° C., the thermal decomposition of the resin constituting the resin layer 3 can be inhibited. Furthermore, the oxidation of the metal magnetic body constituting the metal magnetic body grains 1 and/or the reduction of the ferrite constituting the ferrite grains 7 can also be inhibited, resulting in the prevention of the deterioration in electrical properties caused by the oxidization/reduction. Moreover, the fluid ability of the coated grains 5 and the ferrite grains 7 can be increased by means of the liquid medium and/or the fluid (preferably a solvent) derived from the metal acetylacetonate, and therefore it becomes possible to produce a sintered body having a high ferromagnetic substance (including the metal magnetic body grains and the ferrite grains) filling rate and the magnetic permeability of the sintered body can be improved.

As mentioned above, the sintered body according to one embodiment of the present invention and the method for producing the sintered body are described. However, the present invention is not limited to this embodiment.

EXAMPLES

Example 1

This example relates to a sintered body 30 according to the above-mentioned embodiment with reference to FIG. 1.

Firstly, coated grains in which each of metal magnetic body grains was coated with a resin layer were prepared. As the metal magnetic body grains, grains having an average grain diameter of 5 μm and composed of Fe-6.5Si (wherein "Fe-6.5Si" was referred to an alloy containing 6.5% by mass of Si with the remainder made up by Fe, as generally understood, and the grains were simply expressed as "Fe-6.5Si grains", hereinafter) were used. As a resin material for forming a resin layer, polyimide was used. As a raw material for the polyimide, a polyimide varnish in which a polyamic acid was dissolved at a content ratio (relative to the whole amount) of 12% by mass in N-methyl-2-pyrrolidone (also simply referred to as "NMP", hereinafter) was used. The polyimide varnish and NMP were mixed together at a mass ratio of 1:2 in such a manner that the total mass became 1.596 g to prepare a resin precursor solution. The Fe-6.5Si grains (5 g) was added to the resin precursor solution (1.596 g) (in Table 2, this amount is expressed as "1.6 g" by rough estimation), and the resultant mixture was mixed together by agitation. The resultant mixture was heated on a hot plate at 130° C. to remove an unnecessary liquid material (mainly NMP) by evaporation to dryness. During the drying procedure, agitation was carried out without stopping in order to prevent the separation between the solution and the Fe-6.5Si grains. The dried mixture (granules) was pulverized with a mortar, and the pulverized product was subjected to a heat treatment at 350° C. for 1 hour in a N2 atmosphere (30 L/min.) to cause a polyimdization reaction. By performing the above-mentioned procedure, coated grains in which the polyimide layer was formed on the surface of each of the Fe-6.5Si grains was produced.

Subsequently, for the purpose of preparing ferrite grains, the pulverization of a temporality fired ferrite powder was carried out. As the temporality fired ferrite powder, a Ni—Zn—Cu-based temporality fired ferrite powder having a composition: $Ni_{0.75}Zn_{0.07}Cu_{0.18}Fe_{1.65}O_{4\pm\delta}$ (wherein the numerical subscripts mean atomic ratios) was used. The Ni—Zn—Cu-based temporality fired ferrite powder (100 g), PSZ (partially stabilized zirconia) cobbles (2.4 kg) having a nominal diameter of 2 mm, and pure water (600 g) were introduced in a 1-L pot, and were then pulverized with a ball mill at a rotational frequency of 100 to 200 rpm for 113 hours, and the resultant product was heated on a hot plate at 130° C. to evaporate and remove an unnecessary liquid material (water) to dryness. The dried mixture (granules) was pulverized with a mortar to produce ferrite grains. The specific surface area (SSA) of the ferrite grains was 28 m²/g when measured with a specific surface area measurement device "Macsorb" (reregistered tradename, MOUNTECH Co. Ltd.).

Finally, the coated grains and the ferrite grains were used to produce a sintered body having a ring-like shape. These grains were weighed in such a manner that the amount of the ferrite grains became a value shown in Table 2 relative to the total mass of the coated grains and the ferrite grains and the total mass of the coated grains and the ferrite grains became 3 g, and were then placed in a mortar. Furthermore, a metal acetylacetonate (0.03 g, i.e., 1% by mass) (relative to the mass of the grain mixture) was added to the mixture (3 g) of the grains, then ion exchange water (0.3 g, i.e., 10% by mass) (relative to the mass of the grain mixture) was added to the mixture, and the resultant mixture was fully mixed with a pestle to prepare a raw material mixture. As the metal acetylacetonate component, $Zn(acac)_2$, $Ni(acac)_2$ and $Fe(acac)_2$ were used in such a manner that the content ratios (atomic ratios) of Zn, Ni and Fe became the same as those in the ferrite grains (i.e., Zn:Ni:Fe=0.07:0.75:1.65 (atomic ratios)). The raw material mixture thus prepared was filled in a ring-shaped mold (outer diameter: 17 mm, inner diameter: 10 mm) that had been used commonly for pressure molding, and the mixture filled in the mold was sandwiched by upper and lower heating plates of a pressing machine and was then pressurized to 1000 MPa. The raw material mixture was heated by raising the temperature of the upper and lower heating plates that held the raw material mixture filled in the mold to 300° C. After a lapse of 30 minutes under this pressure at this temperature, the heating was completed, then the heated product was air-cooled spontaneously, and then a sintered body produced was removed from the mold when the temperature reached 100° C. or lower. In this manner, a ring-shaped sintered body was produced.

A magnetic field of up to 100 kA/m was applied to the sintered body, and the magnetic permeability and the direct-current bias characteristics of the sintered body were evaluated with 4991A Precision Impedance Analyzer (KEYSIGHT TECHNOLOGIES). More specifically, as an evaluation measure for a magnetic permeability (exactly a specific magnetic permeability), a real part $\mu'(-)$ of a complex magnetic permeability at 1 MHz without application of no magnetic field was employed; and as an evaluation measure for direct-current bias characteristics, a magnetic field Hsat (A/m) in which the magnetic permeability $\mu'$ decreased by 20% was employed. It can be deemed that, in the measurement range, $\mu'$ is substantially the same as a magnetic permeability (exactly a specific magnetic permeability).

The filling rate (% by volume) of the metal magnetic body grains and the thickness of the resin layer in the sintered body were calculated by observing a sectional surface of the sintered body which was cut at a position close to the center of the sintered body and was then polished. More specifically, the filling rate of the metal magnetic body grains was determined by carrying out image analysis in a SEM observation image. The thickness of the resin layer was determined in the following manner. With respect to a single metal magnetic body grain, the thickness of the resin layer was measured at 10 points or more located on the surface of the metal magnetic body grain which were apart from each other at approximately equal intervals, and then the average value of the measurement values was calculated. This procedure was carried out with respect to 5 metal magnetic body grains 1 in total, and the calculated average values were averaged.

Figure 5:
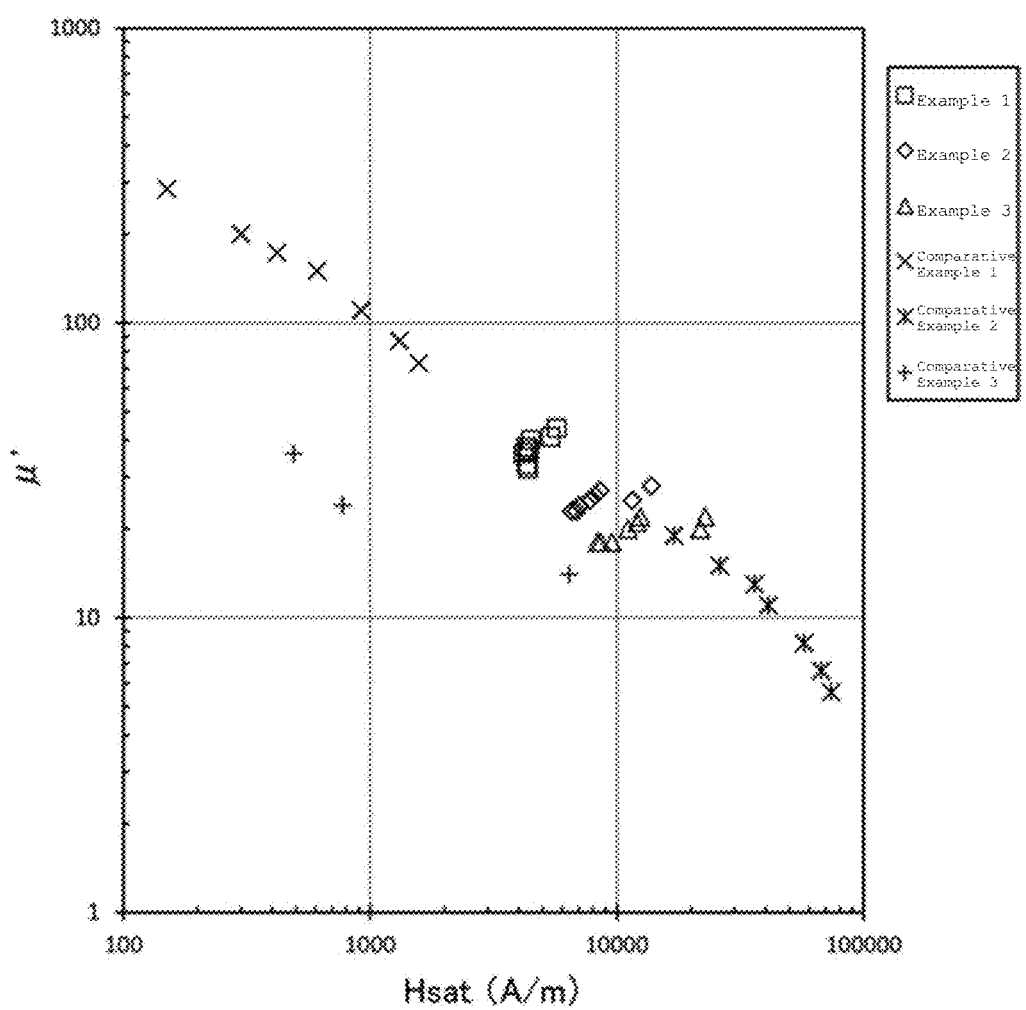
FIG. 5 shows graphs illustrating the relationship between µ' values of sintered bodies and Hsat values in in Examples 1 to 3 and Comparative Examples 1 to 3.
Figure 6:
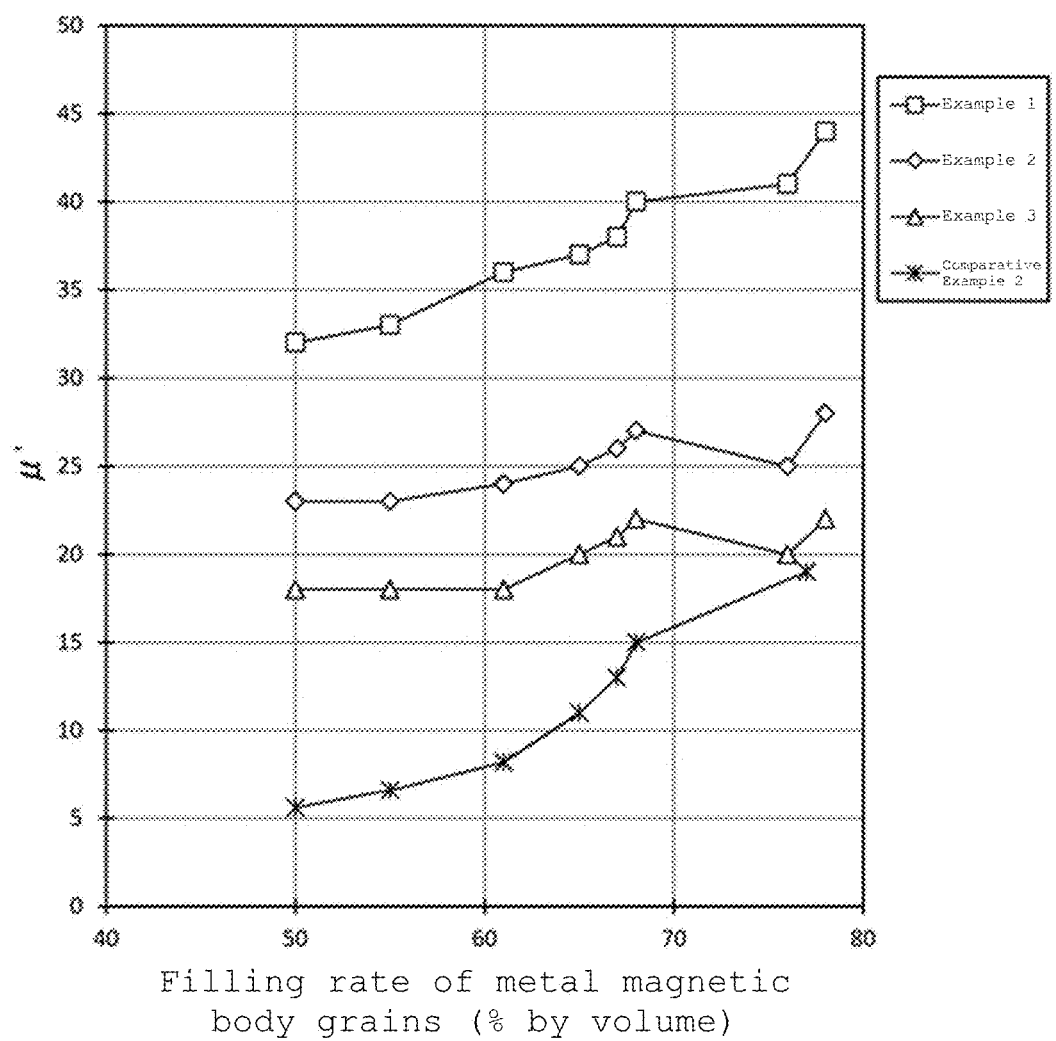
FIG. 6 shows graphs illustrating the relationship between µ' values of sintered bodies and filling rates of metal magnetic body grains in Examples 1 to 3 and Comparative Examples 2.

As a result, the average thickness of the resin layer was 50 nm. The results of $\mu'$, Hsat and filling rate of the metal magnetic body grains are shown together in Table 2, a graph in which $\mu'$ and Hsat are plotted is shown in FIG. 5, and a graph in which $\mu'$ and the filling rate of the metal magnetic body grains are plotted is shown in FIG. 6.

TABLE 2

| | Ferrite content (% by mass) | Amount of resin precursor solution (g) | Filling rate of metal magnetic body grains (% by volume) | $\mu'$ | Hsat (A/m) |
|---|---|---|---|---|---|
| Example 1-1 | 13 | 1.6 | 78 | 44 | 5697 |
| Example 1-2 | 14 | 1.6 | 76 | 41 | 5395 |
| Example 1-3 | 23 | 1.6 | 68 | 40 | 4471 |
| Example 1-4 | 24 | 1.6 | 67 | 38 | 4295 |
| Example 1-5 | 25 | 1.6 | 65 | 37 | 4391 |
| Example 1-6 | 29 | 1.6 | 61 | 36 | 4177 |
| Example 1-7 | 35 | 1.6 | 55 | 33 | 4312 |
| Example 1-8 | 40 | 1.6 | 50 | 32 | 4372 |

Example 2

This example also relates to the sintered body 30 according to the above-mentioned embodiment with reference to FIG. 1. In this Example, a sintered body was produced in the same manner as in Example 1, except that the amount of a resin precursor solution to be used was 3.256 g (in Table 3, this amount is expressed as "3.3 g" by rough estimation) in the preparation of coated grains and ferrite grains were contained at a ferrite content shown in Table 3 relative to the total mass of the coated grains and the ferrite grains in the preparation of a raw material mixture, and the sintered body was evaluated.

As a result, the average thickness of the resin layer was 100 nm. The results of μ', Hsat and filling rate of the metal magnetic body grains are shown together in Table 3, a graph in which μ' and Hsat are plotted is shown in FIG. 5, and a graph in which μ' and the filling rate of the metal magnetic body grains are plotted is shown in FIG. 6.

TABLE 3

| | Ferrite content (% by mass) | Amount of resin precursor solution (g) | Filling rate of metal magnetic body grains (% by volume) | μ' | Hsat (A/m) |
|---|---|---|---|---|---|
| Example 2-1 | 10 | 3.3 | 78 | 28 | 13766 |
| Example 2-2 | 12 | 3.3 | 76 | 25 | 11524 |
| Example 2-3 | 20 | 3.3 | 68 | 27 | 8568 |
| Example 2-4 | 21 | 3.3 | 67 | 26 | 8188 |
| Example 2-5 | 22 | 3.3 | 65 | 25 | 7767 |
| Example 2-6 | 27 | 3.3 | 61 | 24 | 7075 |
| Example 2-7 | 33 | 3.3 | 55 | 23 | 6867 |
| Example 2-8 | 38 | 3.3 | 50 | 23 | 6571 |

Example 3

This example also relates to the sintered body 30 according to the above-mentioned embodiment with reference to FIG. 1. In this Example, a sintered body was produced in the same manner as in Example 1, except that the amount of a resin precursor solution to be used was 4.982 g (in Table 4, this amount is expressed as "5.0 g" by rough estimation) in the preparation of coated grains and ferrite grains were contained at a ferrite content shown in Table 4 relative to the total mass of the coated grains and the ferrite grains in the preparation of a raw material mixture, and the sintered body was evaluated.

As a result, the average thickness of the resin layer was 150 nm. The results of μ', Hsat and filling rate of the metal magnetic body grains are shown together in Table 4, a graph in which μ' and Hsat are plotted is shown in FIG. 5, and a graph in which μ' and the filling rate of the metal magnetic body grains are plotted is shown in FIG. 6.

TABLE 4

| | Ferrite content (% by mass) | Amount of resin precursor solution (g) | Filling rate of metal magnetic body grains (% by volume) | μ' | Hsat (A/m) |
|---|---|---|---|---|---|
| Example 3-1 | 7.6 | 5.0 | 78 | 22 | 22811 |
| Example 3-2 | 9.1 | 5.0 | 76 | 20 | 21781 |
| Example 3-3 | 18 | 5.0 | 68 | 22 | 12435 |
| Example 3-4 | 18 | 5.0 | 67 | 21 | 12054 |

TABLE 4-continued

| | Ferrite content (% by mass) | Amount of resin precursor solution (g) | Filling rate of metal magnetic body grains (% by volume) | μ' | Hsat (A/m) |
|---|---|---|---|---|---|
| Example 3-5 | 20 | 5.0 | 65 | 20 | 11075 |
| Example 3-6 | 24 | 5.0 | 61 | 18 | 9546 |
| Example 3-7 | 30 | 5.0 | 55 | 18 | 8603 |
| Example 3-8 | 36 | 5.0 | 50 | 18 | 8348 |

Comparative Example 1

Figure 2:
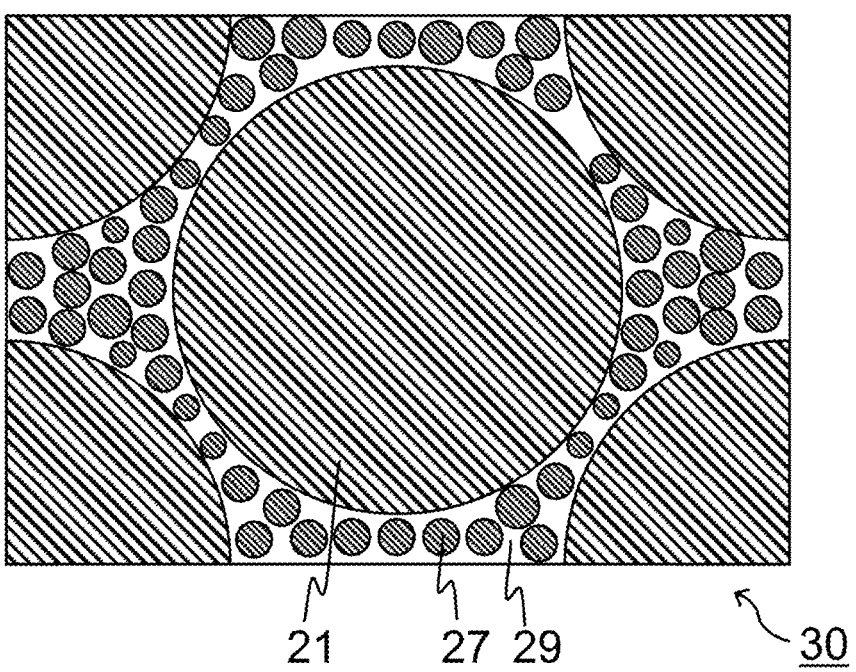
FIG. 2 is a partial schematic diagram showing the structure of a sintered body in Comparative Example 1.

This Comparative Example relates to a sintered body 30 composed of metal magnetic body grains 21 which were not coated with a resin layer, ferrite grains 27 and an amorphous phase 29 which was located between these grains, as shown in FIG. 2. In this Comparative Example, a sintered body was produced in the same manner as in Example 1, except that coated grains were not prepared (i.e., the amount of a resin precursor solution was 0 g), Fe-6.5Si grains were used in place of coated grains, ferrite grains were contained at a ferrite content shown in Table 5 relative to the total mass of the Fe-6.5Si grains and the ferrite grains in the preparation of a raw material mixture, and the sintered body was evaluated.

The results of μ', Hsat and filling rate of the metal magnetic body grains are shown together in Table 5, and a graph in which μ' and Hsat are plotted is shown in FIG. 5.

TABLE 5

| | Ferrite content (% by mass) | Amount of resin precursor solution (g) | Filling rate of metal magnetic body grains (% by volume) | μ' | Hsat (A/m) |
|---|---|---|---|---|---|
| Comparative Example 1-1 | 18 | 0 | 77 | 284 | 150 |
| Comparative Example 1-2 | 25 | 0 | 68 | 200 | 300 |
| Comparative Example 1-3 | 26 | 0 | 67 | 173 | 418 |
| Comparative Example 1-4 | 28 | 0 | 65 | 150 | 611 |
| Comparative Example 1-5 | 32 | 0 | 61 | 110 | 920 |
| Comparative Example 1-6 | 37 | 0 | 55 | 87 | 1311 |
| Comparative Example 1-7 | 42 | 0 | 50 | 73 | 1572 |

Comparative Example 2

Figure 3:
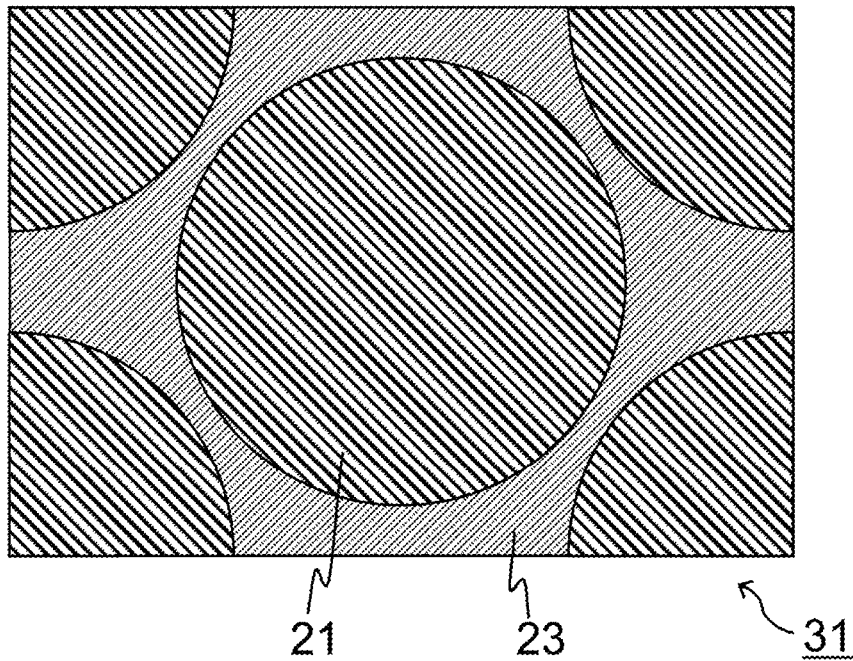
FIG. 3 is a partial schematic diagram showing the structure of a sintered body in Comparative Example 2.

This Comparative Example relates to a sintered body 31 composed of metal magnetic body grains 21 which are not coated with a resin layer and a resin phase 23 which is located between these grains, as shown in FIG. 3. In this Comparative Example, the sintered body was produced in the same manner as in Example 1, except that the amount of a resin precursor solution to be used was adjusted to a value shown in Table 6 in the preparation of coated grains and the resultant coated grains were filled in a ring-shaped mold (outer diameter: 17 mm, inner diameter: 10 mm) that had been used commonly in pressure molding, and the sintered body was evaluated.

The results of μ', Hsat and filling rate of the metal magnetic body grains are shown together in Table 6, a graph in which μ' and Hsat are plotted is shown in FIG. 5, and a graph in which μ' and the filling rate of the metal magnetic body grains are plotted is shown in FIG. 6.

TABLE 6

|  | Ferrite content (% by mass) | Amount of resin precursor solution (g) | Filling rate of metal magnetic body grains (% by volume) | μ' | Hsat (A/m) |
| --- | --- | --- | --- | --- | --- |
| Comparative Example 2-1 | 0 | 7.8 | 77 | 19 | 17060 |
| Comparative Example 2-2 | 0 | 12 | 68 | 15 | 26124 |
| Comparative Example 2-3 | 0 | 13 | 67 | 13 | 36108 |
| Comparative Example 2-4 | 0 | 14 | 65 | 11 | 40978 |
| Comparative Example 2-5 | 0 | 17 | 61 | 8.2 | 57323 |
| Comparative Example 2-6 | 0 | 21 | 55 | 6.6 | 67376 |
| Comparative Example 2-7 | 0 | 26 | 50 | 5.6 | 73815 |

Comparative Example 3

Figure 4:
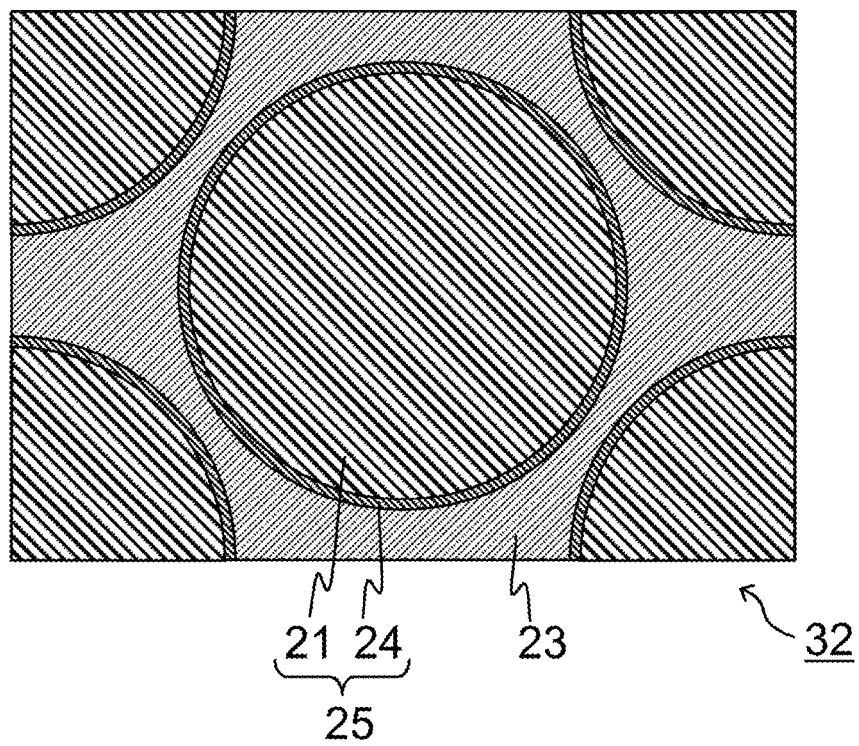
FIG. 4 is a partial schematic diagram showing the structure of a sintered body in Comparative Example 3.

This Comparative Example relates to a sintered body 32 composed of coated grains 25 in which metal magnetic body grains 21 are coated with a ferrite layer 24 and a resin phase 23 which is located between these grains, as shown in FIG. 4. In this Comparative Example, firstly ferrite grains were prepared in the same manner as in Example 1. Subsequently, these grains were weighed in such a manner that the amount of the ferrite grains became a ferrite content shown in Table 7 relative to the total mass of the ferrite grains and the Fe-6.5Si grains, and were then mixed together in a mortar. The resultant mixture was subjected to a dry-mode complexing treatment using NOBILTA MINI (Hosokawa Micron Corporation) to produce ferrite-coated grains in which the Fe-6.5Si grains were coated with a ferrite layer (of which the composition corresponded to that of the ferrite grains). The target thickness of the ferrite layer was 100 nm. Subsequently, the ferrite-coated grains were coated with a resin layer in the same manner as in Example 1, except that the ferrite-coated grains were used in place of the Fe-6.5Si grains and the amount of a resin precursor solution to be used was an amount shown in Table 7. Finally, the resultant grains were filled in a ring-shaped mold (outer diameter: 17 mm, inner diameter: 10 mm) that had been used commonly in pressure molding, and the subsequent procedures were carried out in the same manner as in Example 1. In this manner, a sintered body was produced and was then evaluated.

As mentioned above, the target thickness of the ferrite layer was 100 nm. The results of μ', Hsat and filling rate of the metal magnetic body grains are shown together in Table 7, and a graph in which μ' and Hsat are plotted is shown in FIG. 5.

TABLE 7

|  | Ferrite content (% by mass) | Amount of resin precursor solution (g) | Filling rate of metal magnetic body grains (% by volume) | μ' | Hsat (A/m) |
| --- | --- | --- | --- | --- | --- |
| Comparative Example 3-1 | 7.5 | 10 | 64 | 36 | 490 |
| Comparative Example 3-2 | 7.5 | 11 | 62 | 24 | 773 |
| Comparative Example 3-3 | 7.5 | 12 | 61 | 14 | 6425 |

As is found from FIG. 5 and Tables 2 to 4, each of the sintered bodies of Examples 1 to 3 showed a high Hsat value of 4000 A/m or more and a high μ' value of 15 or more. Particularly, the μ' value was decreased but the Hsat value was improved in the sintered body of Example 2, and the μ' value was decreased but the Hsat value was further improved in the sintered body of Example 3, both compared with the sintered body of Example 1. This is considered to be because the average thickness of the resin layer was increased in order of Example 1, Example 2, and Example 3.

As is found from FIG. 5 and Tables 2 to 5, each of the sintered bodies of Examples 1 to 3 showed a high Hsat value compared with that of the sintered body of Comparative Example 1. This is considered to be because: in the sintered bodies of Examples 1 to 3, a resin was introduced as a non-magnetic gap between the metal magnetic body and the ferrite and, as a result, the direct-current magnetic field generated in the ferrite was reduced and the direct-current bias characteristics was improved; in contrast, in the sintered body of Comparative Example 1, the resin was not introduced and therefore the above-mentioned effects could not be achieved.

As is found from FIG. 5 and Tables 2 to 4 and 6, each of the sintered bodies of Examples 1 to 3 showed a high μ' value at the same Hsat value compared with that of the sintered body of Comparative Example 3 (summarily, in the graphs shown in FIG. 5, points obtained by plotting the Hat values and μ' values of the sintered bodies of Examples 1 to 3 were located at upper right positions compared with points obtained by plotting the Hat values and μ' values of the sintered body of Comparative Example 3). This is considered to be because: in the sintered bodies of Examples 1 to 3, a resin was introduced as a non-magnetic gap between the metal magnetic body and the ferrite and, as a result, the direct-current magnetic field generated in the ferrite was reduced and the direct-current bias characteristics was improved; in contrast, in the sintered body of Comparative Example 3, the resin was introduce but a ferrite was present between the metal magnetic body and the resin and, therefore, the metal magnetic body and the ferrite directly came in contact with each other and a direct-current magnetic field was generated as the result of the magnetization of the metal magnetic body.

As is found from FIG. 6 and Tables 2 to 5, each of the sintered bodies of Examples 1 to 2 was improved in μ' values against the filling rates of the metal magnetic body grains (at a higher filling rate of the metal magnetic body grains of, e.g., 76% by volume or more) compared with the sintered body of Comparative Example 2. This is considered to be because: in the sintered bodies of Examples 1 to 2, ferrite grains having a smaller average grain diameter were introduced at a high density between the coated grains in which the metal magnetic body grains were coated with the resin layer and, as a result, the μ' value was improved due to the ferrite that was a ferromagnetic body; in contrast, in the sintered body of Comparative Example 2, a ferrite that was a ferromagnetic body was not introduced and, therefore, the above-mentioned effect was not achieved.

As is found from FIG. 6 and Tables 4 to 5, the sintered body of Example 3 did not show any advantageous μ' improvement effect at a metal magnetic body grains filling rate of 76% by volume or more compared with the sintered body of Comparative Example 2. This is considered to be because, in the sintered body of Example 3, the average thickness of the resin layer was large (150 nm) and, therefore, the ferrite grains could not be introduced at a satisfactorily high density between the coated grains in which the metal magnetic body grains were coated with the resin layer.

In each of the sintered bodies of Examples 1 to 3, coated grains in which the metal magnetic body grains were coated with a resin layer in advance were used in the production process for the sintered bodies. Therefore, it became possible to prevent the direct contact between the metal magnetic body grains during sintering, and the increase in specific resistance and the reduction in eddy current loss could be expected. Furthermore, it was also considered that the resin layer was present between the metal magnetic body grains and the ferrite grains and, as a result, an interaction between the metal magnetic body and the ferrite (e.g., the oxidization of the metal magnetic body and the reduction of the ferrite) could be inhibited, resulting in the prevention of the deterioration in μ'.

Moreover, in each of the sintered bodes of Examples 1 to 3, the raw material mixture was heated at a temperature of the melting point of the metal acetylacetonate or higher and 350° C. or lower under pressure in the production process for the sintered bodies. It was considered that, due to this low-temperature sintering, the increase in density of the sintered body could be achieved while preventing the thermal decomposition of the resin. It was also considered that, due to this low-temperature sintering, the increase in density in the sintered body could be achieved and the deterioration in μ' could be prevented while inhibiting the oxidization of the metal magnetic body and/or the reduction of the ferrite. It was also considered that, due to this low-temperature sintering, the fluid ability of the metal magnetic body grains and the ferrite grains were improved by means of a liquid medium and/or a fluid derived from the metal acetylacetonate (in this example, water that served as a solvent) and, as a result, a sintered body having a high ferromagnetic substance (including the metal magnetic body grains and the ferrite grains) filling rate was produced and the magnetic permeability of the sintered body was improved.

The sintered body of the present invention can be used as a sintered magnetic component in various electromagnetic apparatuses/devices including an inductor, a trans and a coil. In particular, the sintered body of the present invention can be used suitably as, but is not limited to, a core material in a power inductor.

DESCRIPTION OF REFERENCE SYMBOLS

1: Metal magnetic body grain
3: Resin layer
5: Coated grain
7: Ferrite grain
9: Amorphous phase
10: Sintered body
21: Metal magnetic body grain
23: Resin layer
24: Ferrite layer
25: Coated grain
27: Ferrite grain
29: Amorphous phase
30, 31, 32: Sintered body
61: Metal magnetic powder (metal magnetic body grain)
63: Ferrite layer (ferrite phase)
70: Sintered body

The invention claimed is:

1. A sintered body comprising:
   a plurality of coated grains each comprising a metal magnetic body grain coated with a resin layer;
   a plurality of ferrite grains; and
   an amorphous phase between the plurality of coated grains and the plurality of ferrite grains.

2. The sintered body according to claim 1, wherein the amorphous phase contains a metal element that is the same as a metal element contained in the ferrite grains.

3. The sintered body according to claim 1, wherein an average grain diameter of the ferrite grains is smaller than an average grain diameter of the metal magnetic body grains.

4. The sintered body according to claim 2, wherein the average grain diameter of the ferrite grains is 50% or less of the average grain diameter of the metal magnetic body grains.

5. The sintered body according to claim 1, wherein the resin layer comprises at least one component selected from the group consisting of polyimide, polyamide, polyamide-imide, polyethylene terephthalate, polyetherimide, polytetrafluoroethylene, an epoxy resin and a silicone-based resin.

6. The sintered body according to claim 1, wherein each of the metal magnetic body grains comprises at least one metal magnetic body selected from the group consisting of Fe, a Fe—Si-based metal magnetic body, a Fe—Ni-based metal magnetic body, a Fe—Ni—Mo-based metal magnetic body, a Fe—Si—Al-based metal magnetic body, a Fe—Si—Cr-based metal magnetic body, a Fe-based amorphous metal and a Fe nanocrystal.

7. The sintered body according to claim 1, wherein each of the ferrite grains comprises at least one component selected from the group consisting of Ni—Zn-based ferrite, Ni—Zn—Cu-based ferrite, Ni-based ferrite, Co-based ferrite, Co—Zn-based ferrite, Mn—Zn-based ferrite, Mg—Zn-based and Mg—Zn—Cu-based spinel-type ferrites and magnetopulmbite-type hexagonal Ba ferrites.

8. The sintered body according to claim 1, wherein the resin layer has an average thickness of 100 nm or less.

9. The sintered body according to claim 1, wherein the resin layer coats an entire surface of the metal magnetic body grains.

10. A method for producing a sintered body, the method comprising:
    heating a mixture of a (1) plurality of coated grains each comprising a metal magnetic body grain coated with a resin layer, (2) a plurality of ferrite grains and (3) a metal acetylacetonate at a temperature of a melting point of the metal acetylacetonate or higher and 350° C. or lower under pressure.

11. The method for producing a sintered body according to claim 10, wherein the pressure is 1 MPa to 5000 MPa.

12. The method for producing a sintered body according to claim 10, wherein the mixture is heated in the presence of a fluid.

13. The method for producing a sintered body according to claim 10, wherein the fluid is mixed with the mixture.

14. The method for producing a sintered body according to claim 10, wherein the metal acetylacetonate contains a metal element that is the same as a metal element contained in the ferrite grains.

15. The method for producing a sintered body according to claim 10, wherein an average grain diameter of the ferrite grains is smaller than an average grain diameter of the metal magnetic body grains.

16. The method for producing a sintered body according to claim 10, wherein the resin layer comprises at least one component selected from the group consisting of polyimide, polyamide, polyamide-imide, polyethylene terephthalate, polyetherimide, polytetrafluoroethylene, an epoxy resin and a silicone-based resin.

17. The method for producing a sintered body according to claim 10, wherein each of the metal magnetic body grains comprises at least one component selected from the group consisting of Fe, a Fe—Si-based metal magnetic body, a Fe—Ni-based metal magnetic body, a Fe—Ni—Mo-based metal magnetic body, a Fe—Si—Al-based metal magnetic body, a Fe—Si—Cr-based metal magnetic body, a Fe-based amorphous metal and a Fe nanocrystal.

18. The method for producing a sintered body according to claim 10, wherein each of the ferrite grains comprises at least one component selected from the group consisting of Ni—Zn-based ferrite, Ni—Zn—Cu-based ferrite, Ni-based ferrite, Co-based ferrite, Co—Zn-based ferrite, Mn—Zn-based ferrite, Mg—Zn-based and Mg—Zn—Cu-based spinel-type ferrites and magnetopulmbite-type hexagonal Ba ferrites.

19. The method for producing a sintered body according to claim 10, wherein the resin layer has an average thickness of 100 nm or less.

20. The method for producing a sintered body according to claim 10, wherein the metal acetylacetonate is mixed in an amount of 0.1% by mass to 50% by mass relative to a total mass of the coated grains and the ferrite grains.

* * * * *